United States Patent [19]

Miller

[11] Patent Number: 5,638,862

[45] Date of Patent: Jun. 17, 1997

[54] DIAPHRAGM VALVE

[75] Inventor: Robert F. Miller, Arcadia, Calif.

[73] Assignee: Vemco Corporation, San Dimas, Calif.

[21] Appl. No.: 584,225

[22] Filed: Jan. 11, 1996

Related U.S. Application Data

[60] Provisional application No. 60/007380 Nov. 20, 1995

[51] Int. Cl.$^6$ .................................................... F16K 37/00
[52] U.S. Cl. ........................... 137/557; 137/312; 251/335.2
[58] Field of Search ................................. 137/554, 312, 137/557; 251/335.2

[56] References Cited

U.S. PATENT DOCUMENTS

| | | | |
|---|---|---|---|
| 3,874,636 | 4/1975 | Balce et al. | 251/335.2 |
| 3,952,691 | 4/1976 | Peltz et al. | 137/557 |
| 3,979,105 | 9/1976 | Pool et al. | 251/335.2 |
| 4,171,792 | 10/1979 | Bass | 251/335.2 |
| 4,203,467 | 5/1980 | Cardi | 137/557 |
| 4,684,106 | 8/1987 | Kolenc et al. | 251/335.2 |
| 4,694,848 | 9/1987 | Jorgensen et al. | 251/335.2 |
| 4,760,990 | 8/1988 | Kerger et al. | 251/335.2 |
| 4,840,195 | 6/1989 | Zabrenski | 137/312 |
| 4,874,007 | 10/1989 | Taylor | 137/312 |
| 5,048,554 | 9/1991 | Kremer | 137/69 |
| 5,065,788 | 11/1991 | McManigal et al. | 137/505.18 |
| 5,170,659 | 12/1992 | Kemp | 137/557 |
| 5,203,370 | 4/1993 | Block et al. | 137/312 |

FOREIGN PATENT DOCUMENTS

| | | |
|---|---|---|
| 2127640 | 1/1995 | Canada . |
| 2127641 | 1/1995 | Canada . |
| 635310 | 6/1994 | European Pat. Off. . |
| 9116216 | 10/1991 | Germany . |
| 86439 | 1/1988 | Luxembourg . |
| 86714 | 7/1988 | Luxembourg . |
| 87601 | 2/1990 | Luxembourg . |
| 2274331 | 7/1994 | United Kingdom . |

*Primary Examiner*—A. Michael Chambers
*Attorney, Agent, or Firm*—William W. Haefliger

[57] ABSTRACT

A valve unit to control the flow of high-pressure fluid comprising a housing having a fluid inlet and a fluid outlet; a flow port in the housing communicating between the inlet and outlet, and a seat about the flow port; stem structure in the housing, and a stopper carried by the stem structure to be moved therewith toward and away from the seat; multiple stacked metallic diaphragms connected to the stem structure and to the housing, to flex and seal off therebetween as the stem structure moves, there being a flow chamber in the housing at one side of the diaphragms, and a control chamber in the housing at the opposite side of the diaphragms; control structure carried by the housing and extending into the control chamber to effect the movement of the stem structure, the control structure being movable relative to the housing; and deformable cushion structure in the control chamber to cushion movement of the diaphragm in one direction, and to conform to diaphragm flexing; the diaphragms having outer portions thereof concave toward the flow chamber.

16 Claims, 3 Drawing Sheets

5,638,862

DIAPHRAGM VALVE

BACKGROUND OF THE INVENTION

This application claims priority from provisional application Ser. No. 60/007,380 filed on or about Nov. 20, 1995.

This invention relates generally to valves adapted for use on high-pressure gas cylinders, to control delivery of gas from such cylinders. More particularly, it concerns improvements in the construction and operation of such valves.

There is need for improvements in the construction and operation of cylinder valves, as are provided by the present invention, and which promote safety, reliability, and longevity of such valves.

SUMMARY OF THE INVENTION

It is a major object of the invention to provide improvements meeting the need referred to above.

It is another object of the invention to provide a valve unit to control the flow of high-pressure fluid, and which comprises:

a) a housing having a fluid inlet and a fluid outlet, b) a flow port in the housing communicating between the inlet and outlet, and a seat about the flow port, c) stem structure in the housing, and a stopper carried by the stem structure to be moved therewith toward and away from the seat, d) multiple stacked metallic diaphragms connected to the stem structure and to the housing, to flex and seal off therebetween as the stem structure moves, there being a flow chamber in the housing at one side of the diaphragms, and a control chamber in the housing at the opposite side of the diaphragms, e) control means carried by the housing and extending into the control chamber to effect the movement of the stem structure, the control means being movable relative to the housing, f) and deformable cushion structure in the control chamber to cushion movement of the diaphragm in one direction, and to conform to diaphragm flexing, g) the diaphragms having outer portions thereof concave toward the flow chamber.

Another object is to provide a gap in the control chamber between the stem structure and the housing, and bridged by the stacked metallic diaphragms, the cushion structure located in alignment with the gap. This construction is such as to minimize stress imposed on the diaphragm stack as it repeatedly flexes during opening and closing of the valve unit. To this end, the control means may include a back-up guide at the side of the cushion structure opposite the diaphragms, within the control chamber.

Yet another object is to provide the housing to include a body, and a cap connected to the body, the diaphragm stack having an outer portion looping about the body axis and retained between shoulders defined by the body and cap. A back-up seal may be provided to extend about the axis, and sealing off between the body and cap to block egress of fluid, in the unlikely event of leakage past the diaphragm stack outer portion.

A further object includes provision of a movable control means extending through an opening defined by the cap, and including a back-up seal extending about the axis and sealing off between the cap and the control means.

An additional object is the provision of means on the housing to signal presence of pressurized fluid leaking past the diaphragm and into the control chamber.

A further object is the location of the diaphragm stack outer portion to project annularly outwardly beyond outermost extent of the cushion structure. In this regard, the body typically has a tubular portion defining a projecting end that has a convex annular shoulder clamping the diaphragm stack outer portion. Also, the cap may have an annular concave shoulder against which the diaphragm stack outer portion is conformingly engageable as the diaphragm structure flexes in a direction away from the flow port.

These and other objects and advantages of the invention, as well as the details of an illustrative embodiment, will be more fully understood from the following specification and drawings, in which:

DRAWING DESCRIPTION

DETAILED DESCRIPTION

Figure 1:
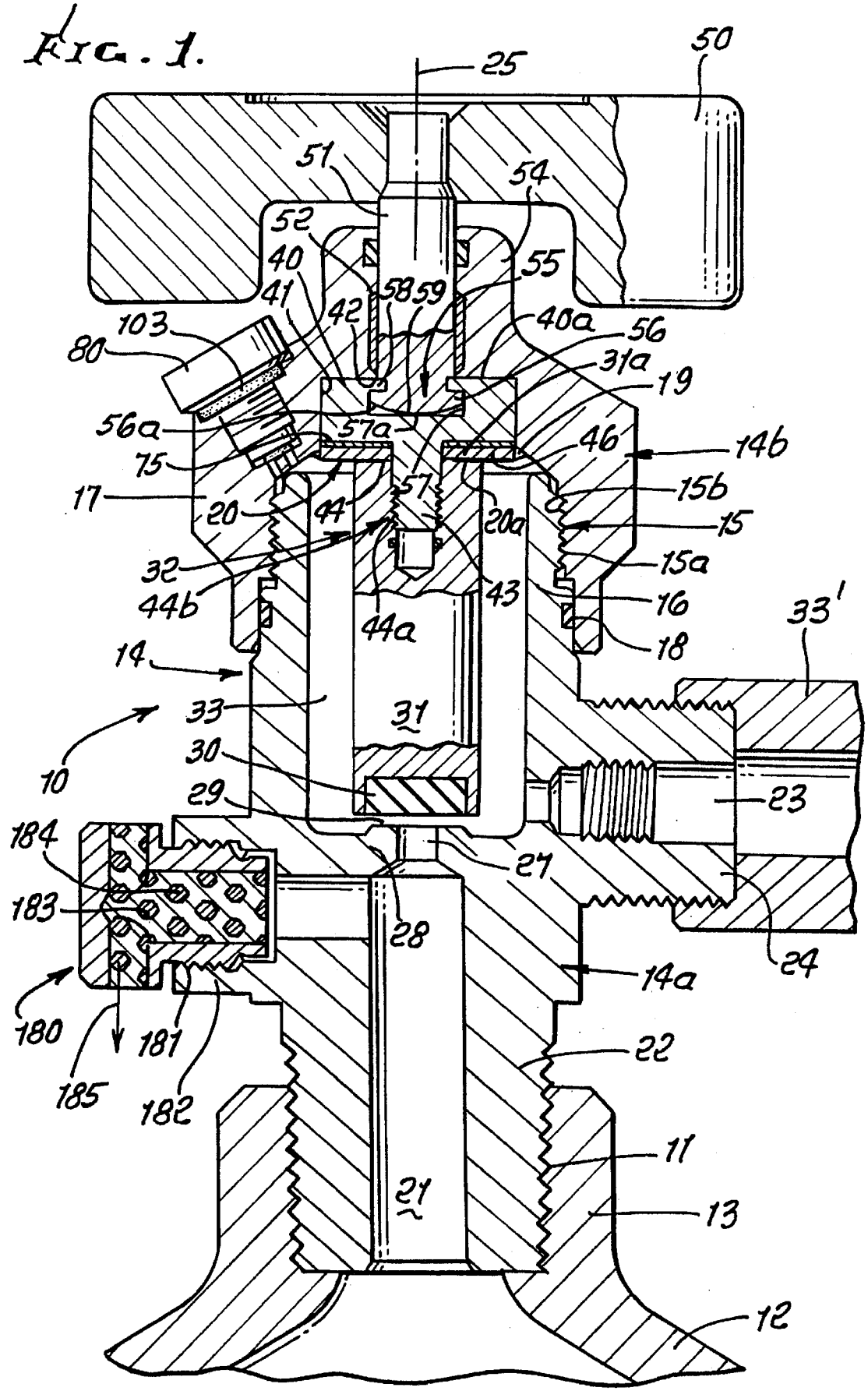
FIG. 1 is a vertical section taken through a valve, incorporating the invention.

The valve unit 10 shown in FIG. 1 is connected at 11 to a high-pressure gas (or other fluid) cylinder 12, as at upper neck 13 of the cylinder. The valve unit includes a metallic housing 14 that in turn may typically include a body 14a and a cap 14b connected to the body at 15. The connection 15 may advantageously include external thread 15a on upper tubular extent 16 of the body, and internal thread 15b on the cap skirt 17 telescopically received over the body upper extent 16. An O-ring seal 18 is provided between 17 and 16, below the thread connection 15, to block escape of any pressurized fluid that may leak past the thread, from a control chamber 19 above a diaphragm structure 20.

The housing body has a pressurized fluid inlet 21 in body lower tubular extent 22, and a pressurized fluid outlet 23 in a body tubular sideward or transverse tubular extent 24. A body longitudinal axis appears at 25. A flow port is provided in the body, as at 27, through body transverse wall 28, and a valve seat is provided at 29 at the upper transversely flat side of wall 28. A seal or stopper 30, carried by a stem 31, is movable upwardly away from the seat and port 27 to open the valve unit, allowing flow from cylinder outlet 32 through 21, 27 and 23, to discharge piping 331; and the seal or stopper is movable downwardly toward the port 27 to close against the seat, blocking fluid flow to 23.

Seal or stopper 30 may consist of non-metallic material, such as an elastomer or plastic substance. Its diameter or width "w" is slightly greater than that of the upwardly protruding seat 29, to ensure tight closure. The stopper and seat may be circular about axis 25, as shown.

Stem structure 32 includes and supports stem 31 to extend axially within flow chamber 33 at the lower side of the diaphragm structure 20, and above wall 28, whereby fluid pressure is exerted upwardly on the diaphragm structure when flow port 27 is open, i.e., seal 30 is elevated, as shown in FIG. 1.

As shown in FIG. 1, the radially inner extent 20a of the diaphragm structure is confined against the upper end 31a of metallic stem 31. A weld may be provided at that location to prevent leakage. The stem structure 32 includes a guide 40 slidable axially in cap bore 41, and having an uppermost position, as shown, in which the upper surface 40a of the guide engages the inner surface 42 of the cap to limit upward travel of the stem structure and the seal or stopper 30, upon opening of the valve.

A central stem or screw 43, integral with the guide 40, projects downwardly through a central opening 44 through the diaphragm structure, and into a threaded bore 44a in the stem 31. Adjustable threaded connection at 44b permits adjustable compression of an annular diaphragm cushion 46 located between a thin metallic washer 75 at the lower surface 40b of the guide, and the upper annular surface extent 20b of the diaphragm structure 20. The latter is defined by a stack of thin metallic diaphragms, which are transversely co-extensive, as shown. Such diaphragms 20b are illustrated, as in FIG. 3.

A control handle 50, located above the cap, is rotatable about axis 25 to move the axial and stem centering guide 40 axially up and down, to open and close the valve. For this purpose, the handle is integral with an upper stem 51, thread connected at 52 to a bore in upper extent 54 of the cap 14b. The lowermost extent of the threaded stem 51 has universal joint connection at 55 to the guide 40, to prevent binding of axial movement of the guide 40, as referred to above. As shown, the connection 55 includes a flange 56 integral with lowermost extent of stem 51, received in an internal groove 57 formed in the guide 40. An annular inner lip 58 on 40 extends over the flange, to captivate it in groove 57; and the convex lower surface 56a of the flange has centralized bearing surface engagement at 59 with the bottom transverse surface 57a of the groove 57. As a result, relatively rotatable, non-binding, thrust-bearing surfaces are provided. In lieu of the thread connected stem, another embodiment would include a cylinder, capable of being pressurized, that would in turn cause a piston to travel forward and move the axial and stem centering guide 40 axially up and down.

Figure 2:
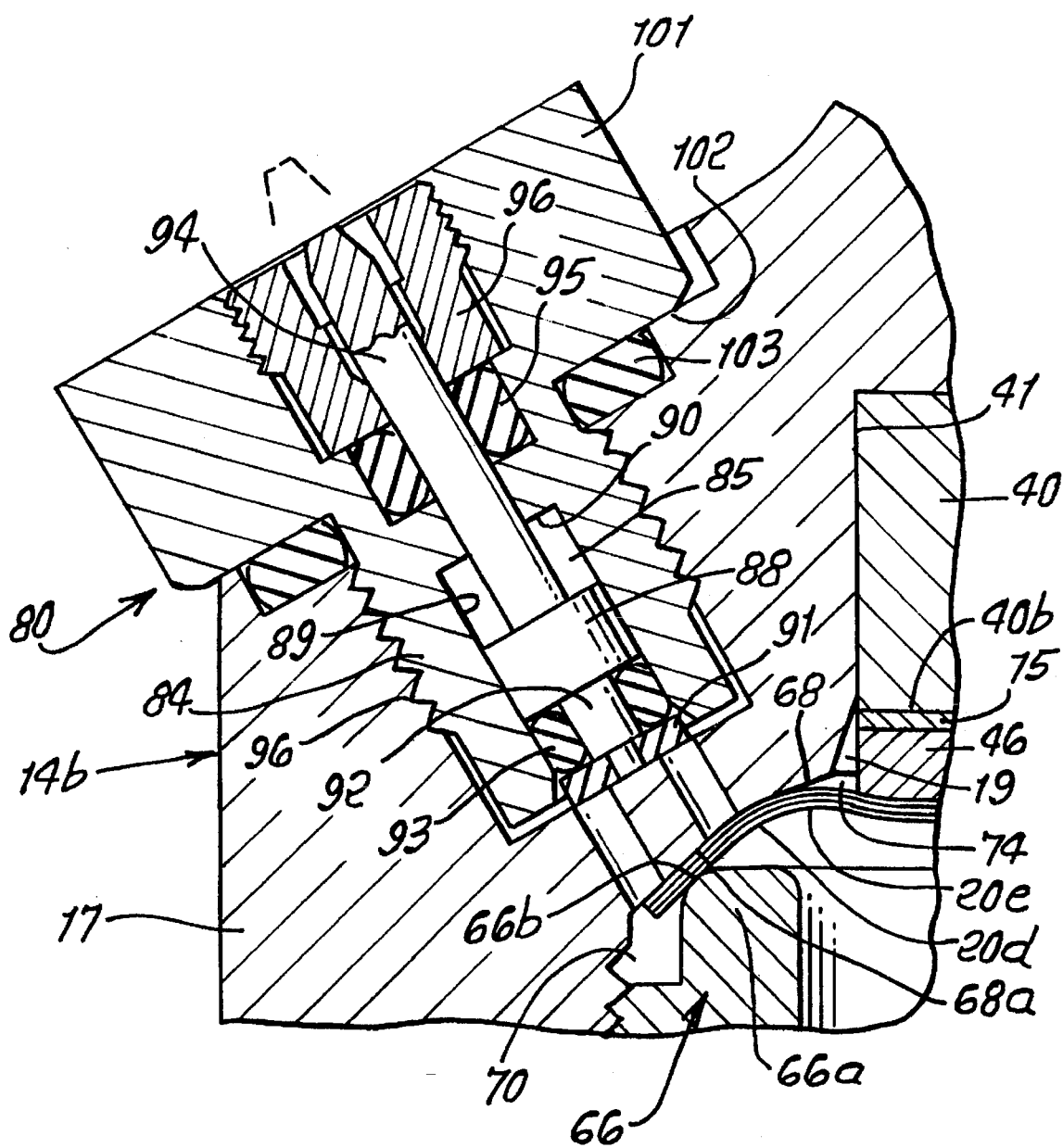
FIG. 2 is an enlarged, fragmentary, vertical section taken through a portion of FIG. 1 showing leak detector details.
Figure 3:
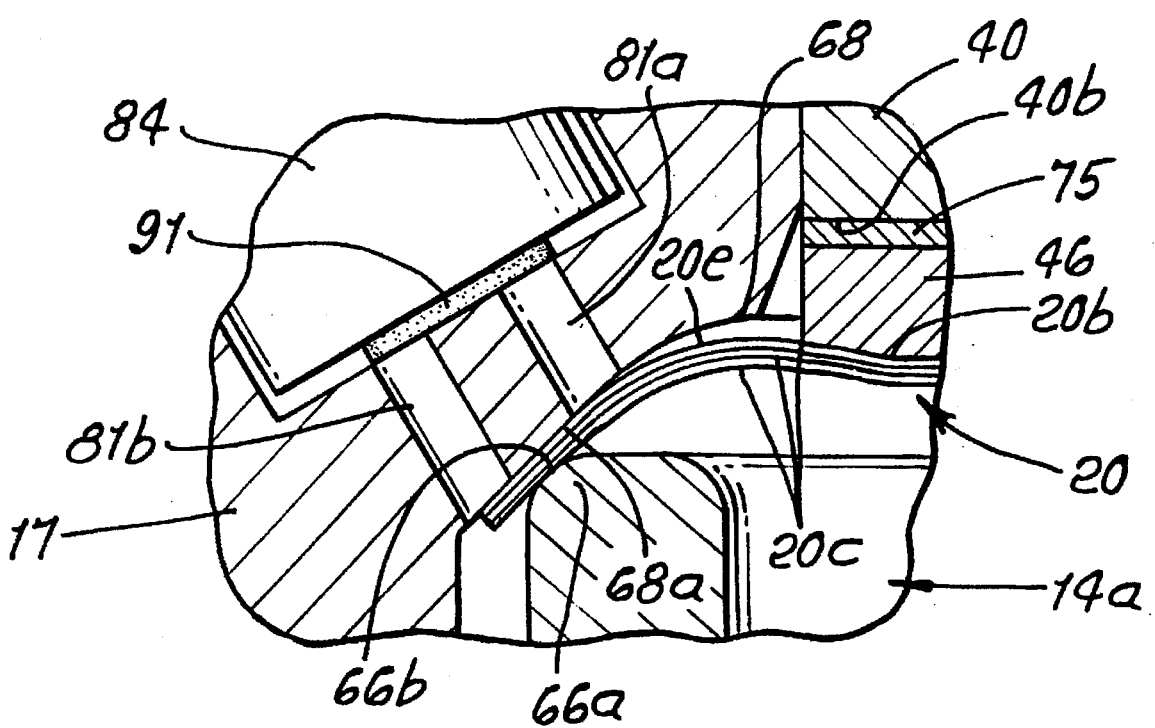
FIG. 3 is a further enlarged fragmentary vertical section taken through a portion of FIG. 2 showing diaphragm details.

Referring to FIGS. 2 and 3, the diaphragm stack 20 has an outer portion 20d that projects annularly outwardly beyond outermost extent of the cushion structure 46. In this regard, body 14a has a tubular, upper terminal portion 66 defining a projecting end 66a that has a convex or domed annular sealing shoulder 66b clamping the diaphragm stack outer portion toward the cap surface 68a. The cap in turn has a complementary annular concave shoulder 68 against which the diaphragm stack outer portion 20d is conformingly engageable as the diaphragm structure in region 20e flexes in a direction away from the flow port. The cap shoulder 68 projects annularly outwardly away from or beyond outermost extent of the cushion structure, and from a shoulder circular outer terminus 68a adjacent the cushion structure that remains adjacent that terminus as the diaphragm flexes and the cushion moves axially. Maximum support for the diaphragm is thereby achieved. A gap 74 is defined in the control chamber between 68 and 46.

The cushion may advantageously consist of Neoprene, of hardness between 65 and 75 shore A. The pressurized metal-to-metal seal at clamping zone or shoulder 66b blocks leakage of high-pressure fluid past the diaphragm. In the unlikely event of such leakage to zone 66b, it will be detected, in the manner to be referred to. Such leakage might occur from the control chamber 19, as via gap 74, and across the upper side of the diaphragm stack, to access passage 81a; or it might occur from the flow chamber 33, and across domed shoulder 66b at the underside of the diaphragm stack, to zone 70 and thence to the passage 81b. Leakage to 71 will be contained by the O-ring seal 18 referred to above. Passages or ports 81a and 81b are in the cap and communicate with signaling means, referred to below.

Referring now to FIG. 2, means on the housing is provided to signal the presence of pressurized fluid leaking past the diaphragm structure 20, as referred to.

The signal means 80 includes a plunger chamber 84 and a plunger 85 movable in the plunger chamber from a retracted, non-signaling position (see full lines in FIG. 2) to extended signaling position (see broken lines in FIG. 2) in response to presence of pressurized fluid leakage past the diaphragm stack.

The plunger includes a piston 88 slidable in bore 89 in the chamber 84 to engage shoulder 90 in signaling position. Leakage pressure is transmitted via either or both ports 81a and 81b to elastomer annular sensing pad 91 in bore 89, and to the plunger stem 92. Note annular elastomer O-ring 93 about that stem and sealing against the bore 89. The plunger outer stem 94 projects through an O-ring 95 retained by sleeve 96, through which stem 94 projects, as shown. Chamber 84 has thread-connected reception at 96 in the cap 14. Chamber head flange 101 rests at shoulder 102 on the cap, and pressurizes a large elastomer O-ring 103 to seal off between 84 and the cap.

Leakage of pressure fluid via the upper or lower sides of the clamped diaphragm stack is thereby signaled.

The following are important features of the invention:

Upwardly Convex Radius

The diaphragms have been formed with a radius to allow for the axial movement they must undergo during normal operation of the valve. To insure that the diaphragms remain under a tensile load, which is highly desirable, the diaphragms are formed to be upwardly convex from the high-pressure cavity or flow chamber. Accordingly, the diaphragms are concave toward the high-pressure flow chamber.

From the point at which the diaphragm structure is sealed between the cap and the body inwardly for some distance, the diaphragm is fully supported by the cap. When the valve is fully open, the diaphragm inwardly of such support by the cap is fully supported by the diaphragm cushion. Thus, in the open position, substantially the entire diaphragm is fully supported by a combination of the cap and the diaphragm cushion.

Inner Transition Radius

To help spread the load of the diaphragms evenly and over as large a surface extent as possible, the upwardly convex diaphragm radius has a small transition between it and the piston area that closely supports the diaphragm cushion. The diaphragm cushion completely supports the piston area. The inner transition radius is upwardly concave and is therefore potentially weak. However, this region is fully supported by the diaphragm cushion.

Diaphragm Cushion 46

To enable the load on the diaphragms to be constantly and consistently supported during the entire axial movement, the resilient diaphragm cushion 46 and a cushion washer 75 are sandwiched between the diaphragms and the stem or screw 43. They are held in place by tightening the diaphragm screw 43 to a level that puts a compressive pre-load on the resilient diaphragm cushion. See FIG. 3. As the diaphragms flex up and down, the diaphragm cushion is deformed to closely back up the shape of the diaphragms. When the load and the need for support increases, the diaphragm cushion will distort more and flow out into any diaphragm areas that have no support, such as diaphragm areas adjacent 74 and 19. When the load and the need for support decreases, the "memory" of the resilient elastomer cushion helps draw it back into its original shape, allowing it to retain the ability to store energy for the next time the load, and the need for support increases.

Cushion Washer 75

The cushion washer is located between the stem or screw 51 and the diaphragm cushion. The cushion washer allows the diaphragm screw to be tightened into the seal holder without putting any radial shear on the diaphragm cushion. This greatly enhances the cushion's ability to support a load and return to its original shape when the load is removed.

Diaphragm Screw 43

The diaphragm screw transmits the axial load from the adjusting screw to the seal holder 31 and diaphragms 20*d*. The cap bore 41 closely receives the guide 40 integral with the diaphragm screw. The opening of this bore has a conical shape to allow for distortion of the diaphragm cushion, and to prevent shearing it. The depth of this bore is such that, when the valve is fully open, all axial load is removed from the adjusting screw. The diaphragm screw will then make contact with the bottom 42 of this bore and fully support the load placed on the diaphragms. This will prolong the useful life of the adjusting screw, as it will spend the majority of its operating life with no axial load exert in on the threads at 44*b*. The aforementioned bottoming aspect of the diaphragm screw also acts as a finite limit on how far the valve can be opened by hand. This will prevent the diaphragm from being overflexed upwardly, upon opening of the valve, and cause the amount of annular gap between the seat and seal to be closely controlled, thereby guaranteeing consistency of flow performance from unit to unit.

Also illustrated is a means to provide outgassing from port 21 to the interior in case of excess temperature rise. Note plug 180 threaded at 181 into body side fitting 182. The plug stem contains passages 183, which intercommunicate. Metal 184 in such passages melts at high temperatures, and drains outwardly (see arrow 185), thereby to provide an outgassing passage or passages.

Typically, a diaphragm that is used as a boundary between areas of high and low pressure has several mechanisms of failure. High pressure gas can leak around the clamp area on the periphery, leak through the welded area near the centerline, or leak through the diaphragm, as would be the case if it were to rupture.

In the type of cylinder valve disclosed, a failure of the diaphragm presents the problem that any leak would remain undetected for a long time, due to the back-up O-rings that are installed. The function of these back-up O-rings is to protect against leakage from the valve unit in the event of a diaphragm leak.

The present invention alerts an attendant to a leaking diaphragm, without allowing any of the gas to escape to the surrounding environment, and is positioned in such a way that one device will detect a leak from any of the three above-mentioned modes or places.

As referred to, the cap of the diaphragm valve is drilled and threaded to receive a threaded body. This body houses a pin that is fitted with two O-rings that serve as a pressure boundary. On the end of this pin is affixed a sensing pad. This sensing pad exerts an upward force, when exposed to any increase in gas pressure, causing the end of the pin to protrude from the threaded body in a manner that is immediately noticeable to an experienced attendant. The bottom of the drilled and threaded hole is made flat, and two holes of smaller diameter machined through to intersect the internal abutment shoulder that is on the inside of the cap. The holes intersect the abutment shoulder in such a way so as to be able to communicate leaks from the center of the diaphragm outward to the sensing pad, and the outer edge of the diaphragm inwards to the sensing pad. Leakage from any conceivable failure mode of the diaphragm can thereby be detected and registered by a single device.

I claim:

1. In a valve unit to control the flow of high-pressure fluid, the combination comprising
   a) a housing having a fluid inlet and a fluid outlet,
   b) a flow port in the housing communicating between the inlet and outlet, and a seat about said flow port,
   c) stem structure in the housing, and a stopper carried by the stem structure to be moved therewith longitudinally axially toward and away from said seat,
   d) multiple stacked metallic diaphragms connected to the stem structure and to the housing, to flex and seal off therebetween as the stem structure moves, there being a flow chamber in the housing at one side of the diaphragms, and a control chamber in the housing at the opposite side of the diaphragms,
   e) control means carried by the housing and extending into the control chamber to effect said movement of the stem structure, the control means being movable relative to the housing,
   f) and deformable cushion structure in said control chamber to cushion movement of the diaphragm in one direction, and to conform to diaphragm flexing,
   g) said diaphragms having outer portions thereof concave toward said flow chamber, said concave outer portions projecting generally radially outwardly of said cushion structure and also longitudinally,
   h) said diaphragms having annular inner portions thereof retained between portions of said cushion structure and said stem structure.

2. The combination of claim 1 wherein there is a gap in the control chamber between said stem structure and said housing, and bridged by the stacked metallic diaphragms, said cushion structure located in alignment with said gap.

3. The combination of claim 2 wherein said stem structure defines a longitudinal axis of movement, and said diaphragms extend laterally to bridge said gap at locations where the diaphragms are convex toward said gap.

4. The combination of claim 3 wherein said control means includes a back-up guide at the side of the cushion structure opposite the diaphragms, within said control chamber.

5. The combination of claim 3 wherein said housing includes a body and a cap connected to said body, the diaphragm stack having an outer portion looping about said axis and retained between shoulders defined by said body and cap, the diaphragm concave outer portions being substantially fully supported by the cap and said cushion structure when the stopper has been fully moved away from the seat, the cushion structure being non-metallic and connected to stem structure projecting through the diaphragms.

6. The combination of claim 5 including a back-up seal extending about said axis and sealing off between said body and cap to block egress of fluid leaking past said diaphragm stack outer portion.

7. The combination of claim 5 wherein said movable control means extends through an opening defined by the cap, and including a back-up seal extending about said axis and sealing off between said cap and said control means.

8. The combination of claim 7 wherein said control means includes a control handle outside the housing, and including a pressurized fluid-containing cylinder supporting the valve unit, the valve unit inlet having communication with fluid in said cylinder.

9. In combination of claim 5 wherein said diaphragm stack outer portion projects annularly outwardly beyond outermost extent of said cushion structure.

10. The combination of claim 9 wherein said body has a tubular portion defining a projecting end that has a convex annular shoulder clamping a skirt defined by said diaphragm stack outer portion.

11. The combination of claim 10 wherein said cap has an annular concave shoulder against which said diaphragm stack outer portion is conformingly engageable as the diaphragm structure flexes in a direction away from the flow port.

12. The combination of claim 11 wherein said cap concave annular shoulder projects annularly outwardly away from outermost extent of the cushion structure, and from a circular, outer terminus that remains adjacent the cushion structure as the diaphragm flexes.

13. The combination of claim 1 including means on the housing to signal presence of pressurized fluid leaking past the diaphragm and into said control chamber.

14. The combination of claim 1 wherein said stem structure includes elements that are adjustable to adjustably compress the cushion structure.

15. The combination of claim 14 wherein said elements have threaded interconnection, and said stem structure has a bottoming position in which axial loading exerted by fluid pressure on the diaphragm structure is transmitted to the housing and independently of any threaded interconnection.

16. The combination of claim 1 wherein said stem structure has a bottoming position that limits the upward travel of said diaphragms upon opening of the valve unit.

* * * * *